United States Patent
Guegan et al.

(10) Patent No.: US 7,962,310 B2
(45) Date of Patent: Jun. 14, 2011

(54) METHOD FOR ESTIMATING THE LONGITUDINAL SPEED OF A MOTOR VEHICLE

(75) Inventors: Stephane Guegan, Versailles (FR); Gabriel Toffolo, Villejust (FR)

(73) Assignee: Renault S.A.S., Boulogne Billancourt (FR)

( * ) Notice: Subject to any disclaimer, the term of this patent is extended or adjusted under 35 U.S.C. 154(b) by 298 days.

(21) Appl. No.: 12/161,105

(22) PCT Filed: Jan. 3, 2007

(86) PCT No.: PCT/FR2007/050606
§ 371 (c)(1),
(2), (4) Date: Oct. 16, 2008

(87) PCT Pub. No.: WO2007/083047
PCT Pub. Date: Jul. 26, 2007

(65) Prior Publication Data
US 2010/0169040 A1    Jul. 1, 2010

(30) Foreign Application Priority Data
Jan. 20, 2006 (FR) ...................... 06 00530

(51) Int. Cl.
*G06F 15/00* (2006.01)
*G01P 15/00* (2006.01)
(52) U.S. Cl. ......................................... 702/142; 73/488
(58) Field of Classification Search .................. 702/142, 702/148; 701/29, 82; 73/488, 511
See application file for complete search history.

(56) References Cited

U.S. PATENT DOCUMENTS

| 4,651,281 | A  | * | 3/1987 | Masaki et al. ................ 701/79 |
| 5,371,688 | A  |   | 12/1994 | Fujioka |
| 6,816,804 | B1 |   | 11/2004 | Lee |
| 2004/0093945 | A1 | | 5/2004 | Bauer et al. |

FOREIGN PATENT DOCUMENTS

| DE | 101 22 653 | 7/2002 |
| EP | 0 539 060 | 4/1993 |
| FR | 2 871 889 | 12/2005 |

* cited by examiner

*Primary Examiner* — Bryan Bui
(74) *Attorney, Agent, or Firm* — Oblon, Spivak, McClelland, Maier & Neustadt, L.L.P.

(57) ABSTRACT

A method for estimating longitudinal speed of a motor vehicle, including two drive wheels and at least one central electronic unit, based on rotational speeds of the four wheels two of which are drive wheels, such that, after arranging the rotational speeds in descending order: in an acceleration phase, the vehicle longitudinal speed is compared with the speed of the third fastest wheel, and its acceleration should not exceed that of the slowest wheel; in a deceleration phase, the longitudinal speed is compared with the speed of the fastest wheel and its acceleration in absolute value should not exceed that of the second fastest wheel; when the longitudinal speed ranges between the speed of the third fastest wheel and that of the fastest wheel, its value remains constant.

5 Claims, 3 Drawing Sheets

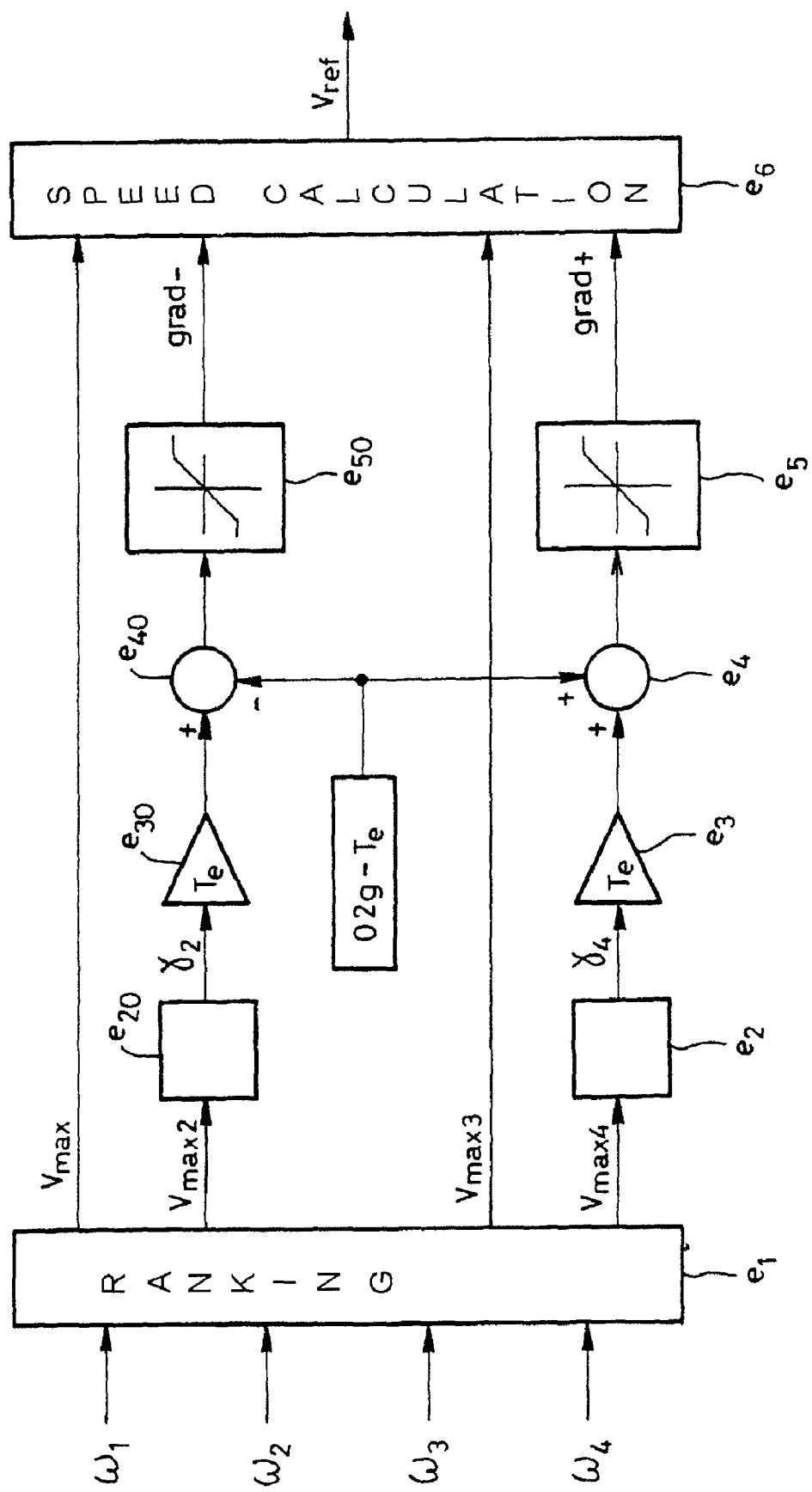
FIG_1

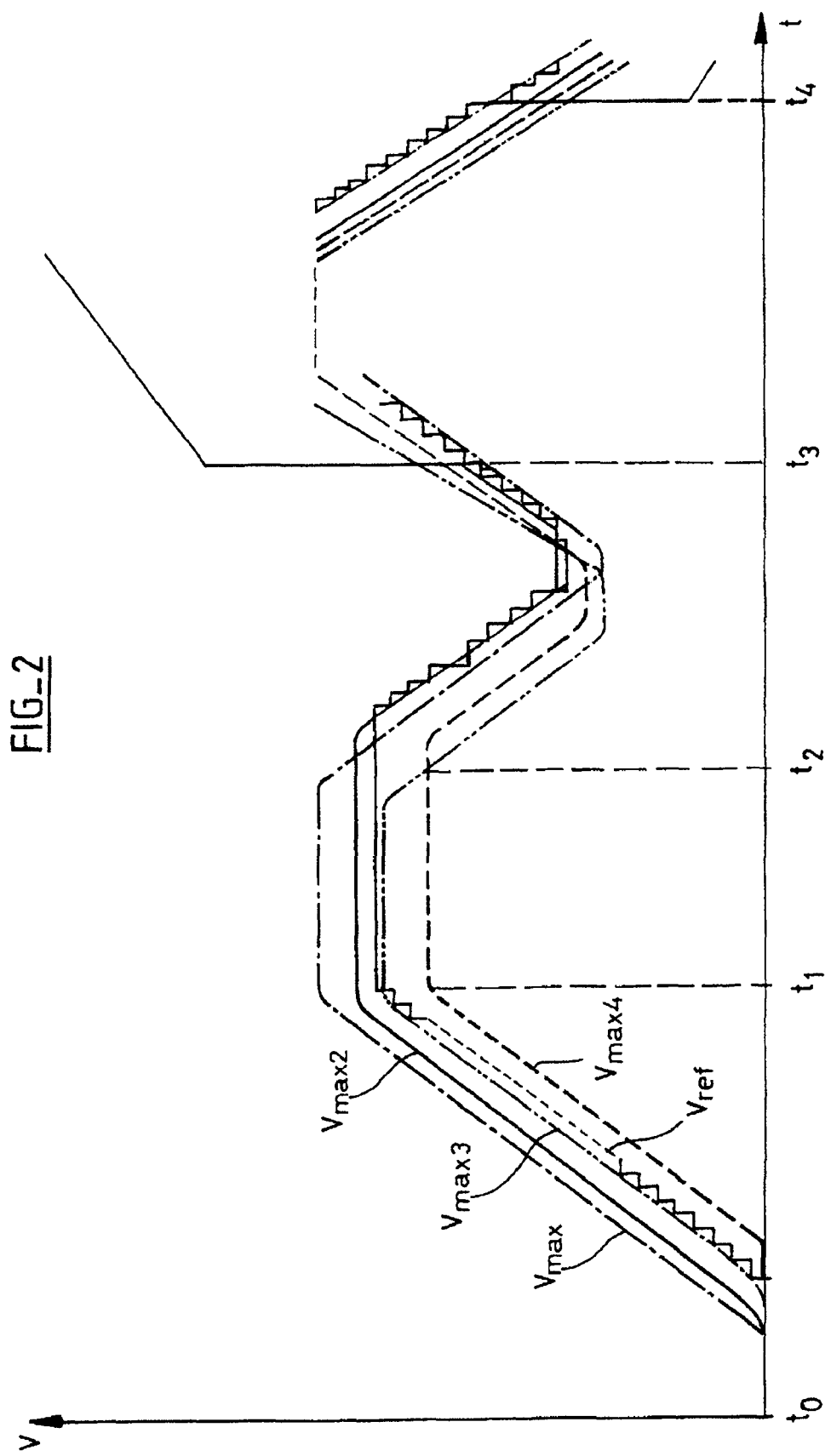
FIG_2

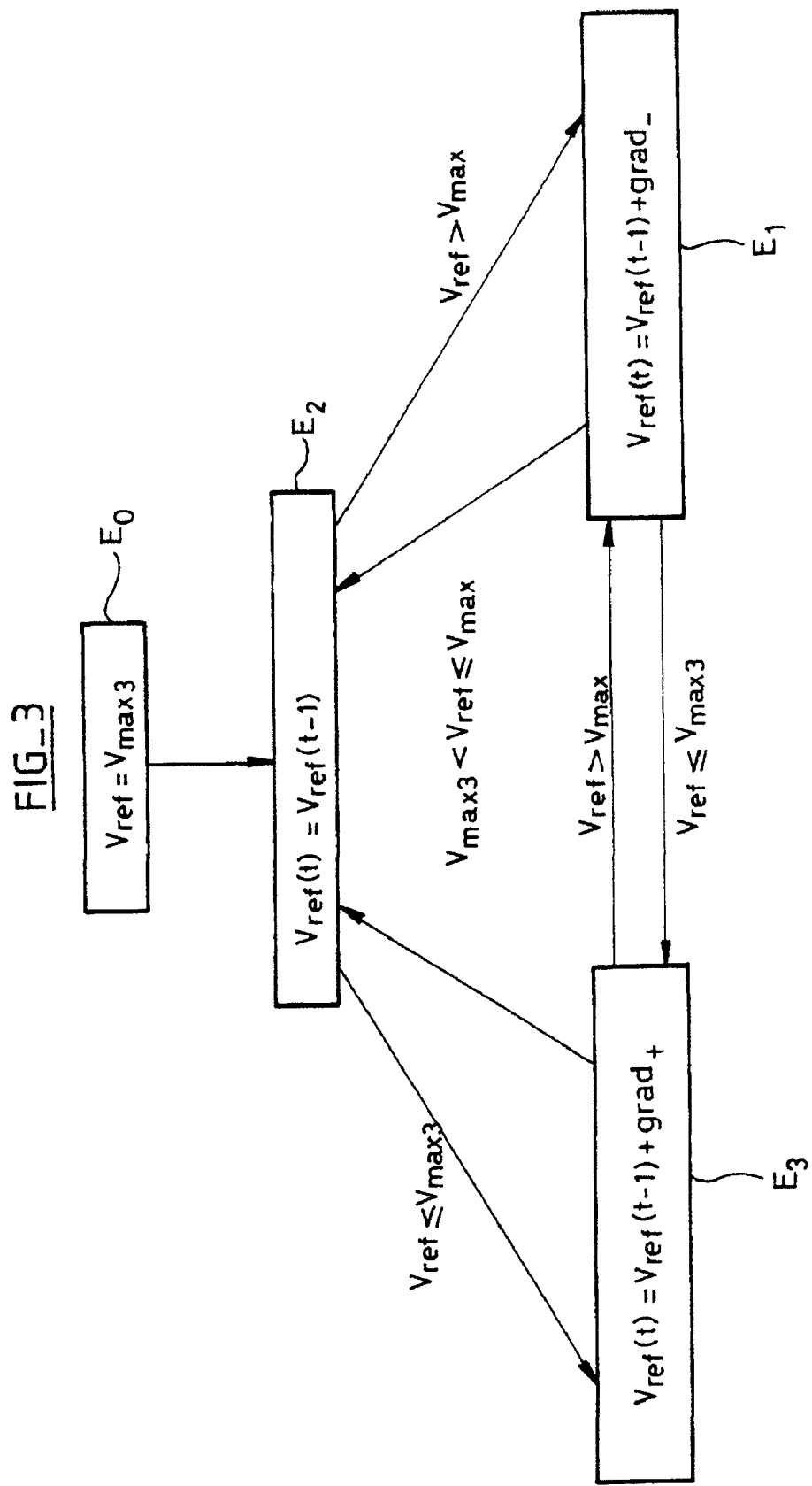

METHOD FOR ESTIMATING THE LONGITUDINAL SPEED OF A MOTOR VEHICLE

BACKGROUND OF THE INVENTION

1. Field of the Invention

The invention relates to a method for estimating the longitudinal speed of a motor vehicle with two driven wheels, from the rotational speeds of its four wheels.

2. Discussion of the Background

Most of the controlled systems of a vehicle, such as the braking system, the electric power assisted steering system and the system for controlling the four wheels when all four wheels are steered, need information regarding the longitudinal speed of the vehicle. This is generally estimated from the rotational speeds of the four wheels, as measured by sensors.

One of the technical problems of this estimating stems from the unrealistic "jumps", that is to say speed gradients that are too great to correspond to an actual variation in the speed of the vehicle, whether under nominal circumstances or if there is an undetected failure of one or more of the wheel rotational speed sensors.

The current estimating methods, which are unable to give rise to large speed gradients, use a sensor that senses the longitudinal acceleration of the vehicle, as described for example in the CONTINENTAL TEVES Inc. American patent U.S. Pat. No. 6,792,803. However, a solution such as this is expensive because it adds a sensor to the vehicle.

SUMMARY OF THE INVENTION

The invention proposes to estimate on the basis of information provided by the four wheel speed sensors and has the advantage that the dynamic range of discrepancy from the actual speed of the vehicle remains small, even under situations in which the ABS (antilock braking system), the ESP (electronic stability program) or the TCS (traction control system) are in operation, under cornering, when there is substantial slippage of one or more wheels, when there is an undetected failure of a wheel speed sensor or alternatively still, when one or more wheels is locked up or spinning. In addition, the method according to the invention is simple to implement in a vehicle electronic central processing unit such as the one that controls braking for example.

The method of estimating the longitudinal speed of a vehicle equipped with two driven wheels and with at least one electronic central processing unit of which a controller runs the method on the basis of the rotational speeds of the four wheels, two of which are driven, is characterized in that:

- under acceleration, the longitudinal speed is compared with the speed of the third fastest wheel, and its acceleration must not exceed that of the slowest wheel;
- under deceleration, the longitudinal speed is compared with the speed of the fastest wheel and its acceleration in absolute terms must not exceed that of the second fastest wheel;
- when the longitudinal speed lies between the speed of the third fastest wheel and that of the fastest wheel, its value remains constant.

According to another feature of the estimating method according to the invention, in an acceleration phase, the gradient of the speed of the vehicle between two consecutive moments t−1 and t is obtained from the product of the derivative with respect to time of the speed of the slowest wheel $V_{max4}$ multiplied by the duration $T_e$ of a calculation cycle, to which there is added a term $V_s$ equivalent to an additional acceleration, determined as a safety measure:

$$V_{ref}(t) = V_{ref}(t-1) + grad_+,$$
$$= V_{ref}(t-1) + \left[\frac{dV_{max4}}{dt} \times T_e \times 3.6 - V_s\right]$$

said speed gradient being saturated between a lower threshold of zero value and a maximum threshold corresponding to the maximum acceleration that the vehicle can withstand given the performance of its engine.

According to another feature of the estimating method of the invention, in a deceleration phase, the gradient of the speed of the vehicle between two consecutive moments t−1 and t is obtained from the product of the derivative with respect to time of the speed of the second fastest wheel $V_{max2}$ multiplied by the duration $T_e$ of a calculation cycle, from which is subtracted a term $V_s$ equivalent to an additional acceleration, determined as a safety measure:

$$V_{ref} = V_{ref}(t-1) + grad_-,$$
$$= V_{ref}(t-1) + \left[\frac{dV_{max2}}{dt} \times T_e \times 3.6 - V_s\right]$$

said speed gradient being saturated by a maximum threshold of zero value and a minimum threshold corresponding to the maximum deceleration that the vehicle can withstand given the tires with which it is fitted.

According to another feature of the estimating method according to the invention, between a consecutive acceleration phase and deceleration phase, if the value of the speed of the vehicle lies between that of the third fastest wheel and that of the fastest wheel, this value remains constant for each calculation cycle.

BRIEF DESCRIPTION OF THE DRAWINGS

Other features and advantages of the invention will become apparent from reading the description illustrated by the following figures which are:

FIG. 1: a block diagram of the estimating method according to the invention;

FIG. 2: the variations over time in the longitudinal speed of the vehicle and in the speeds of the wheels;

FIG. 3: the flowchart for the various stages in calculating the speed as a function of the movement of the vehicle, according to the invention.

DETAILED DESCRIPTION OF THE PREFERRED EMBODIMENTS

The method of estimating the longitudinal speed of the vehicle according to the invention is based on the information regarding the rotational speed $\omega_i$ of the four wheels of the vehicle, converted into linear speeds $V_i$. These four rotational speeds are delivered by the wheel speed sensors usually fitted to the vehicle for the benefit of controlled braking systems or electronic stability systems, amongst other things.

These four linear wheel speeds are ranked in decreasing order, in each calculation cycle, performed approximately every 10 ms, and listed from the fastest wheel speed $V_{max}$ to the fourth fastest wheel speed, that is to say the speed of the slowest wheel $V_{max4}$. The method applies to a vehicle with two driven wheels.

In an acceleration phase, the speed $V_{ref}$ of the vehicle is compared with the speed of the third fastest wheel, namely $V_{max3}$, updated for each calculation cycle lasting $T_e$, and its acceleration is calculated so that it does not exceed that of the slowest of the four wheels. To do that, the speed $V_{max4}$ of this slowest wheel is differentiated and the gradient of the speed $V_{ref}$ of the vehicle between the moments t−1 and t is equal to the product of this derivative of the speed of the slowest wheel $V_{max4}$ times the duration $T_e$ of a calculation cycle, to which is added a term $V_s$ which is equivalent to an additional acceleration of 0.2 g by way of a safety measure. This is because in the case of a system with four steered wheels, a drift in the longitudinal speed equivalent to 0.2 g is unsafe. Thus, the gradient of the reference speed can be written, in km/h, using the following equation:

$$V_{ref}(t) - V_{ref}(t-1) = \frac{dV_{max4}}{dt} \times T_e \times 3.6 + V_s$$

$$V_{ref}(t) - V_{ref}(t-1) = \frac{dV_{max4}}{dt} \times T_e \times 3.6 + 0.2g \times T_c \times 3.6$$

Because the maximum acceleration that a vehicle can physically withstand is equal to 0.65 g, given the performance of its engine, the speed gradient is limited between a lower threshold equal to 0 and an upper threshold equal to 0.65 g×$T_e$. Thus, if the gradient is below the maximum threshold, its value is added to the speed value $V_{ref}(t-1)$ estimated in the previous calculation cycle in order to determine the new speed value $V_{ref}(t)$. If the gradient is above this maximum threshold, then it is this last value which will be used to determine the new vehicle speed value:

$$V_{ref}(t) = V_{ref}(t-1) + \text{grad}_+$$

In the curves showing the variation of the maximum speeds $V_{max}$, $V_{max2}$, $V_{max3}$ and $V_{max4}$ of the four wheels of the vehicle with respect to time as depicted in FIG. 2 it can be seen that, between the moments t0 and t1, the estimated speed of the vehicle $V_{ref}$ follows the change in the two lowest speeds, and its acceleration does not exceed that of the slowest wheel to which an additional acceleration of 0.2 g is added. In the event of a breakdown or failure of one of the sensors pertaining to these two slowest wheels, at the moment t3, the estimated speed of the vehicle will not "jump", that is to say will not exhibit too high a gradient, because it follows the acceleration of the slowest wheel. The curve of the estimated speed of the vehicle is shown in broken line and failure of a sensor pertaining to the third fastest wheel is shown as a step in measured speed $V_{max3}$.

In the schematic diagram of FIG. 1, the method takes account of the speed $V_{max4}$ of the slowest wheel, determined by the step $e_1$) of ranking the wheel speeds in decreasing order, the drift with respect to time in a filtering step $e_2$) differentiating at 1 Hz, for example, in order to attenuate the noise generated by digital differentiation, in order to obtain the acceleration $\gamma_4$ of this wheel which is to be multiplied, in step $e_3$), by the calculation cycle duration $T_e$. To this product thus obtained there is added an acceleration of 0.2 g in step $e_4$) and the speed gradient thus obtained is saturated in step $e_5$) between a minimum threshold of zero value and a maximum threshold corresponding to an acceleration of 0.65 g in order to give the speed gradient grad, that allows the speed of the vehicle in an acceleration phase to be calculated, in step $e_6$).

In the deceleration phase, the acceleration of the vehicle is estimated from the second fastest wheel $V_{max2}$ and the speed of the vehicle $V_{ref}$ is compared with the speed of the fastest wheel $V_{max}$. As the diagram of FIG. 1 shows, the speed $V_{max2}$ of the second fastest wheel is differentiated in step $e_{20}$) by a filtering differentiating at 1 Hz for example, to obtain the acceleration $\gamma_2$ of this wheel, which is then multiplied by the calculation cycle duration $T_e$ in step $e_{30}$). An additional acceleration of 0.2 g, for this same calculation cycle $T_e$, is subtracted in step $e_{40}$) in order to obtain a speed gradient, which is saturated in step $e_{50}$) by two thresholds, an upper threshold equal to 0 and a lower threshold corresponding to the maximum deceleration that the vehicle can physically withstand given the tires with which it is fitted, namely −1.25 g. The speed $V_{ref}$ of the vehicle is calculated in step $e_6$).

In the curves that show the variation with respect to time of the maximum speeds $V_{max}$, $V_{max2}$, $V_{max3}$ and $V_{max4}$ of the four wheels of the vehicle, which are depicted in FIG. 2, it can be seen that, between the moments t2 and t3, the estimated speed of the vehicle $V_{ref}$ follows the change in the two fastest wheels, and its deceleration is less than that of the second fastest wheel to which an additional acceleration of 0.2 g is added.

If the speed sensor pertaining to one of the two wheels that have the highest rotational speeds should fail, for example at the moment t4, the acceleration of the vehicle will not be able to be less than that of the fastest wheel the sensor of which is operating because it follows the variation in the second fastest wheel of the vehicle.

The gradient of the speed of the vehicle under deceleration can be written thus, in km/h:

$$V_{ref}(t) - V_{ref}(t-1) = \frac{dV_{max2}}{dt} \times T_e \times 3.6 + V_s$$

$$V_{ref}(t) - V_{ref}(t-1) = \frac{dV_{max2}}{dt} \times T_e \times 3.6 + 0.2g \times T_c \times 3.6$$

If this gradient is higher in absolute terms than the aforementioned minimum threshold, then it is this value equal to $-1.25$ g.$T_e$ that will be used as the gradient grad_ for the speed under deceleration:

$$V_{ref}(t) = V_{ref}(t-1) + \text{grad}_-$$

In the curves showing the variation with respect to time of the maximum speeds $V_{max}$, $V_{max2}$, $V_{max3}$ and $V_{max4}$ of the four wheels of the vehicle as depicted in FIG. 2, it can be seen that, between the moments t2 and t3, the estimated speed of the vehicle $V_{ref}$ follows the change in the two fastest wheels and its deceleration is less than that of the second fastest wheel to which an additional acceleration of 0.2 g is added.

Between these two consecutive phases of acceleration and of deceleration when the speed of the vehicle is constant, it is compared with the speed $V_{max3}$ of the third fastest wheel, on the one hand, and with the speed $V_{max}$ of the fastest wheel, on the other hand, and its value remains the same for each calculation cycle $T_e$, because its gradient is zero, as shown by FIG. 2 between the moments t1 and t2:

$$V_{ref}(t) = V_{ref}(t-1)$$

The flowchart of FIG. 3 describes the various stages in calculating the speed of the vehicle as a function of its travel, from the initial state $E_0$ at the moment t0 at which the vehicle is started, which is the input state of the controller that carries out the method within the vehicle electronic central processing unit. The speed $V_{ref}$ of the vehicle adopts the value $V_{max3}$ of the third fastest wheel. In the next cycle, transition to the state $E_2$ defined by calculating the speed of the vehicle at the moment t, equal to the value at the previous moment t−1, is immediate, the speed gradient $\text{grad}_0$ being zero.

If the speed $V_{ref}$ is lower than or equal to the value of the third fastest wheel $V_{max3}$, the method switches to the state $E_3$ for which the speed of the vehicle at the moment t is equal to the value at the previous moment t−1, to which the gradient grad$_+$ determined for acceleration is added.

If the speed $V_{ref}$ is higher than the value of the third fastest wheel $V_{max3}$ but lower than or equal to that $V_{max}$ of the fastest wheel, the method reverts to the state $E_2$ for which the speed has to remain constant, its gradient being zero.

If the speed $V_{ref}$ is higher than the speed $V_{max}$ of the fastest wheel, the method switches either from the state $E_2$ or from the state $E_3$ to the state $E_1$ for which the speed of the vehicle at the moment t is equal to the value at the previous moment t−1, to which the gradient grad$_-$ determined for deceleration is added.

Thus, the vehicle arrives in the state $E_1$ from the two states $E_2$ and $E_3$ when $V_{ref} > V_{max}$. In this state $E_1$, its longitudinal speed is decremented by the value of grad$_-$ for each calculation cycle $T_e$:

$$V_{ref}(t) = V_{ref}(t-1) + \text{grad}_-$$

The vehicle reaches the state $E_2$ from the initial state $E_0$ or from the states $E_1$ or $E_3$ when $V_{max3} < V_{ref} V \leq_{max}$ and the value of its speed remains constant: $V_{ref} = V_{max3}$ The vehicle arrives at the state $E_3$ from the states $E_1$ and $E_2$ when $V_{ref} \leq V_{max3}$, and its longitudinal speed is increased by grad$_+$ on each calculation cycle $T_e$:

$$V_{ref}(t) = V_{ref}(t-1) + \text{grad}_+$$

The invention has numerous advantages including that of not using an additional sensor, particularly a sensor that senses the longitudinal acceleration of the vehicle, and that it avoids any unrealistic speed gradient. It will advantageously be used as an input to the laws controlling the system that controls the four steered wheels of a vehicle.

The invention claimed is:

1. A method of estimating longitudinal speed of a motor vehicle including two driven wheels and at least one electronic central processing unit of which a controller runs the method based on rotational speeds of the four wheels, two of which are driven, said method comprising:
   determining a first fastest wheel, a second fastest wheel, a third fastest wheel, and a fourth fastest wheel,
   in an acceleration phase, calculating an estimated longitudinal speed of the vehicle based on the speed of the third fastest wheel, and calculating an acceleration of said vehicle so that said acceleration does not exceed the acceleration of the fourth fastest wheel;
   under deceleration in a deceleration phase, calculating the estimated longitudinal speed of the vehicle based on the speed of the first fastest wheel and calculating the acceleration of said vehicle in absolute terms so that said acceleration does not exceed that of the second fastest wheel; and
   when the estimated longitudinal speed of the vehicle lies between the speed of the third fastest wheel and the speed of the first fastest wheel, maintaining said estimated longitudinal speed constant.

2. An estimating method according to claim 1, wherein in the acceleration phase, the gradient of the estimated speed of the vehicle between two consecutive moments (t−1) and (t) is obtained from the product of the derivative with respect to time of the speed of the fourth fastest wheel ($V_{max4}$) multiplied by the duration ($T_c$) of a calculation cycle, to which there is added a term ($V_s$) equivalent to an additional acceleration, determined as a safety measure:

$$V_{ref}(t) = V_{ref}(t-1) + \text{grad}_+,$$
$$= V_{ref}(t-1) + \left[\frac{dV_{max4}}{dt} \times T_e \times 3.6 + V_s\right]$$

the speed gradient being saturated by a minimum threshold of zero value and a maximum threshold corresponding to the maximum acceleration that the vehicle can withstand given the performance of its engine.

3. An estimating method according to claim 1, wherein in the deceleration phase, the gradient of the estimated speed of the vehicle between two consecutive moments (t−1) and (t) is obtained from the product of the derivative with respect to time of the speed of the second fastest wheel ($V_{max2}$) multiplied by the duration ($T_c$) of a calculation cycle, from which is subtracted a term ($V_s$) equivalent to an additional acceleration, determined as a safety measure:

$$V_{ref} = V_{ref}(t-1) + \text{grad}_-,$$
$$= V_{ref}(t-1) + \left[\frac{dV_{max2}}{dt} \times T_e \times 3.6 + V_s\right]$$

the speed gradient being saturated by a maximum threshold of zero value and a minimum threshold corresponding to the maximum deceleration that the vehicle can withstand given the tires with which the vehicle is fitted.

4. An estimating method according to claim 1, wherein, between the acceleration phase and the deceleration phase, if the value of the speed of the vehicle lies between that of the third fastest wheel and that of the first fastest wheel, this value remains constant for each calculation cycle.

5. An estimating method according to claim 1, wherein steps in calculating the estimated speed of the vehicle as a function of travel, from an initial state ($E_0$) at the moment the vehicle is started, when the estimated longitudinal speed ($V_{ref}$) of the vehicle adopts the value ($V_{max3}$) of the third fastest wheel, are as follows:
   in a next cycle, transiting to a state ($E_2$) defined by calculating the estimated speed of the vehicle at the moment (t), equal to the value at the previous moment (t−1), is immediate, a speed gradient (grad$_0$) being zero,
   if the estimated longitudinal speed ($V_{ref}$) is lower than or equal to the value of the third fastest wheel ($V_{max3}$), switching from the state ($E_2$) to a state ($E_3$) for which the estimated longitudinal speed of the vehicle at the moment (t) is equal to the value at the previous moment (t−1), to which the gradient (grad+) determined for acceleration is added,
   if the speed ($V_{ref}$) is higher than the speed ($V_{max}$) of the fastest wheel, switching either from the state ($E_2$) or from the state ($E_3$) to the state ($E_1$) for which the estimated longitudinal speed of the vehicle at the moment t is equal to the value at the previous moment (t−1) from which the gradient (grad.) determined for deceleration is subtracted,
   if the speed ($V_{ref}$) is higher than the value of the third fastest wheel ($V_{max3}$) but lower than that ($V_{max}$) of the fastest wheel, returning either from the state ($E_1$) or from the state ($E_3$) to the state ($E_2$) for which the speed has to remain constant, its gradient being zero.

* * * * *